Sept. 25, 1951
O. C. JONES
2,569,128
METHOD OF PRODUCING PHOSPHORUS SULFIDES
Filed March 24, 1948
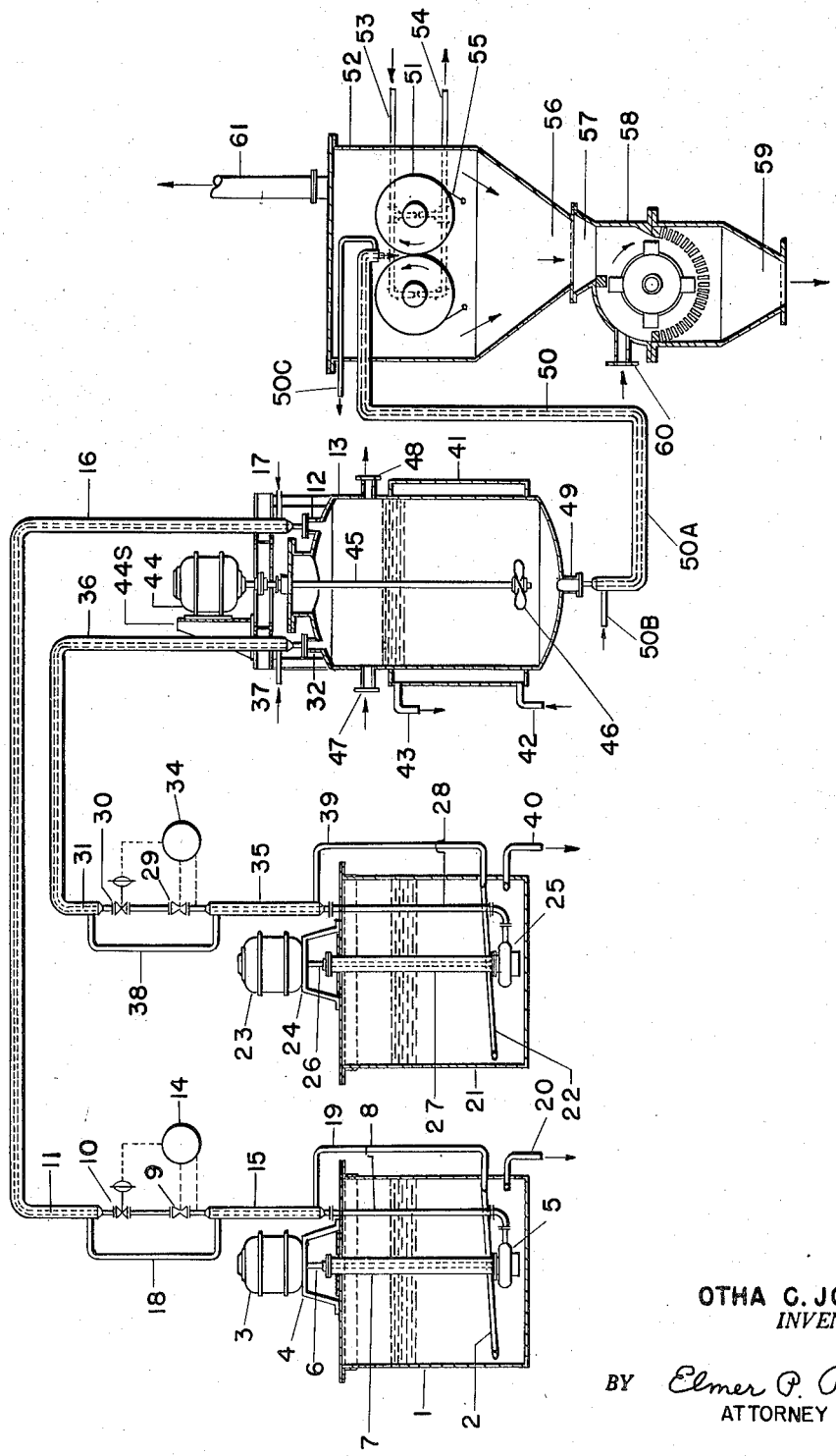
OTHA C. JONES
*INVENTOR.*
BY Elmer P. Rucker
ATTORNEY Patented Sept. 25, 1951

2,569,128

UNITED STATES PATENT OFFICE 2,569,128

METHOD OF PRODUCING PHOSPHORUS SULFIDES

Otha C. Jones, Anniston, Ala., assignor to Monsanto Chemical Company, St. Louis, Mo., a corporation of Delaware Application March 24, 1948, Serial No. 16,785

10 Claims. (Cl. 23—206)

The present invention relates to phosphorus sulfides and to an improved method of producing same.

One object of the invention is to provide an economically and commercially feasible method of producing phosphorus sulfides.

Another object is to provide a method of producing phosphorus sufides in which the reaction proceeds rapidly and smoothly to completion without the formation of undesirable by-products.

Another object is to provide a method of producing phosphorus sulfides in which the phosphorus-sulfur reaction is so controlled that little, if any, phosphorus, sulfur or phosphorus sulfides are lost by volatilization and hence high quality products are directly formed in substantially quantitative yields.

An additional object is to provide a method of producing phosphorus sulfides which avoids the formation of crude heterogeneous mixtures such as are obtained by directly reacting phosphorus with sulfur in the absence of a solvent, and at the same time yields, without the use of extraneous solvents, the high quality products of the solvent method.

A further object is to provide a method of producing phosphorus sulfides on a commercial scale which does not require the use of large equipment, and the handling and recovery of relatively large volumes of solvent.

A still further object is to provide a method whereby phosphorus sulfides can be produced in a continuous and highly efficient manner.

Other objects and advantages will be apparent to those skilled in the art as the description proceeds.

Heretofore, phosphorus sulfides have been produced by directly reacting phosphorus with sulfur in the proportions calculated to yield the desired product, but due to the highly exothermic nature of the reaction, this method has presented a number of disadvantages.

For example, white phosphorus and sulfur do not react with each other at temperatures below about 175° C. to 200° C. and when a batch of phosphorus is heated to this temperature and sulfur added, the resulting heat of reaction is so intense that a portion of the phosphorus is violently converted to the red form and in addition excessively large amounts of reactants and product are lost by volatilization. On the other hand, when the order of addition is reversed, that is, when phosphorus is introduced into a batch of sulfur heated to a temperature within the above range, a violent reaction also takes place with substantially the same results. In either event, unless these reactants are brought together at such a slow rate as to render the method commercially unattractive, the reaction is very difficult to control and the localized superheating which invariably occurs brings about the development of side reactions and varying degrees of volatilization of phosphorus, sulfur and phosphorus sulfides throughout the batch with the result that the yield and quality of the desired product are seriously impaired. Finally, the above method is subject to the drawback of requiring relatively large equipment for large volume production, of offering many opportunities for product degradation by moisture and adventitious contamination and of yielding a hard solid material which presents a laborious grinding problem.

As a means of overcoming the above difficulties, it has been proposed to carry out the reaction between phosphorus and sulfur in the presence of an inert organic solvent such as alpha-chlornaphthalene, benzene, xylene or tetralin. These solvents, by reason of their bulk and capacity for absorbing heat, prevent the reaction from becoming violent and by dissolving the reactants and reaction products, facilitate the completion of the reaction and the formation of the desired products. This method constitutes a decided advance in the art, but it has the disadvantage of requiring the handling and disposal of relatively large volumes of solvent, and also the use of large equipment for large scale production. In addition, the foregoing method yields products which are contaminated with adhering solvent and consequently for some applications, it is essential to include an additional procedural step in order to provide a product of the desired purity. All of these disadvantages materially add to processing and equipment costs and thereby render the solvent method commercially unattractive.

I have developed a relatively simple, economically and commercially feasible method of manufacturing phosphorus sulfides which presents none of the difficulties or disadvantages enumerated above. In accordance with this method, phosphorus and sulfur are introduced with agitation into a molten batch of phosphorus sulfide and reacted in the proportions calculated to yield the desired product, the heat of reaction being absorbed by the molten batch and transferred thereby to a suitable heat exchanging surface or material. The product of the reaction is withdrawn from the reaction zone, flaked on chill rolls and then converted into a powder by grinding in a hammer mill or equivalent pulverizing device.

The composition of the molten reaction medium is varied with the phosphorus sulfide to be produced, that is, if phosphorus pentasulfide, phosphorus sesquisulfide or phosphorus heptasulfide is desired, then the reaction medium should have substantially the same composition. Moreover, if the final product is to be a mixture of phosphorus sulfides of predetermined composition, the same consideration applies to the composition of the reaction medium.

The phosphorus and sulfur may be charged to the reaction medium at relatively rapid rates with the assurance of obtaining a quiet uniform reaction and a product substantially free of undesired impurities. In fact, the only limitation on the rate at which the above reactants may be brought together under the foregoing conditions is the efficiency with which the heat of reaction is removed from the reaction medium.

The phosphorus-sulfur reaction may be carried out batchwise, but is preferred to practice the method in a continuous manner, in which case the above materials are continuously reacted together in the proportions required to produce the desired phosphorus sulfide, and the resulting product is then removed from the reaction zone as rapidly as it is formed. When practiced in a batchwise or semi-continuous manner, the phosphorus and sulfur may be charged to the reaction medium at different times or at a variable rate provided the total amount of each reactant corresponds to that required to yield the desired product.

For a more complete understanding of the present improved method of making phosphorus sulfides, reference is made to the following specific examples, it being understood that they are illustrative and not in any sense limitative of the invention.

Example I

The apparatus employed in this embodiment of the instant invention consisted essentially of sulfur and phosphorus feeders, a reactor provided with a stirrer for agitating the charge, inlets for introducing phosphorus and sulfur, means for purging the reactor with an inert gas and a take-off tube from the bottom thereof for discharging the molten product into a suitable receiver.

The reactor was charged with phosphorus pentasulfide and then heated to a temperature of 300° C. to convert the charge into the molten condition. The stirrer was then set into motion and while purging the reactor with carbon dioxide 402 milliliters of sulfur at about 135° C. (sp. gr. 1.792) and 155 milliliters of phosphorus at about 60° C. (sp. gr. 1.731) were charged to the reactor over a period of 135 minutes. The reaction proceeded quietly and uniformly at a temperature of about 298° C. to 304° C. and the resulting phosphorus pentasulfide was continuously discharged from the reactor while molten into a receiver and allowed to cool and solidify in the presence of carbon dioxide. The solidified product was ground to a finely divided state and on analysis was found to have substantially the following properties.

| Per Cent P | Per Cent S | Melting Point |
|---|---|---|
| 27.80 | 71.98 | 285° C. |

The above closely approximate the properties of practically pure phosphorus pentasulfide, which are as follows:

| Per Cent P | Per Cent S | Melting Point |
|---|---|---|
| 27.93 | 72.07 | 286° C.–290° C. |

Example II

Phosphorus heptasulfide was introduced into the above reactor and melted by heating to a temperature of 315° C., whereupon the stirrer was set into motion and while purging with carbon dioxide, 281 milliliters of sulfur at 120° C. and 161 milliliters of phosphorus at about 60° C. were slowly added and mixed in the molten charge during a period of 1 hour. The resulting reaction proceeded smoothly at a temperature of from 312° C. to 315° C. and the molten phosphorus heptasulfide thus produced was discharged continuously from the reactor into a receiver and allowed to cool in the presence of anhydrous carbon dioxide. Upon solidification, the product was finely divided by grinding and on analysis was found to have the following properties which indicated that it was substantially pure phosphorus heptasulfide.

| Per Cent P | Per Cent S | Melting Point |
|---|---|---|
| 35.91 | 64.13 | 305–310° C. |
| Theory 35.5 | 64.5 | 305–310° C. |

Example III

Phosphorus sesquisulfide was added to the above reactor and converted to the molten state by heating to a temperature of about 315° C. Then, while operating the stirrer and purging the reactor with carbon dioxide, 112 milliliters of sulfur at about 120° C. and 142 milliliters of phosphorus at about 60° C. were introduced into the molten sesquisulfide over a period of 1 hour, during which time the reaction temperature was maintained within the range of 313° C. to 318° C. The reaction proceeded very quietly and the phosphorus sesquisulfide thereby obtained was discharged continuously from the reactor in the presence of anhydrous carbon dioxide and allowed to cool and solidify in a receiver under the same conditions. The product upon cooling to room temperature was a waxy yellow solid having a melting point of 163° C. to 168° C., thus indicating that it was practically pure phosphorus sesquisulfide.

The foregoing examples have been restricted to a batch or semi-continuous process of making phosphorus sulfides, but it will be apparent from the following description that the process may be carried out in a continuous manner. In describing this embodiment of the invention, reference will be made to the accompanying drawing which illustrates an equipment flow sheet of my continuous process.

In the drawing, reference character 1 represents a sulfur tank provided with a steam line 2 for melting and maintaining the sulfur in a molten condition. This tank is also equipped with a motor 3 mounted on support 4, a pump 5 operated by shaft 6 and a pump support 7.

When operating, pump 5 forces molten sulfur out of tank 1 by way of line 8 and then feeds it through venturi 9, valve 10, line 11 and inlet 12 into reactor 13, the rate of feed being regulated by automatic flow controller 14. The lines 8 and 11 are respectively provided with jackets 15 and 16 so that the sulfur conveyed from tank 1 to reactor 13 is maintained in the molten state by heat exchange with steam. The steam used for this purpose and for melting and maintaining the sulfur in tank 1 in the molten condition is introduced into the system by line 17 and conveyed by jacket 16, line 18, jacket 15, and lines 19 and 2 into the above tank from which it is exhausted by means of line 20.

Reference character 21 is a phosphorus tank equipped with a hot water line 22 for melting and maintaining the phosphorus in the molten state. As indicated in the drawing, the phosphorus tank is provided with a motor 23, a motor support 24, a pump 25 actuated by shaft 26 and a pump support 27.

Upon energization, the motor 23 drives pump 25 and thus forces molten phosphorus from tank 21 by way of line 28, whereupon it is fed through venturi 29, valve 30, line 31 and inlet 32 into reactor 13, the phosphorus feed being controlled by automatic flow controller 34. The lines 28 and 31 are provided with jackets 35 and 36 at the points indicated in the drawing so that hot water can be passed in heat exchanging relationship with the feed for the purpose of preventing the phosphorus from freezing. The hot water to serve this function is introduced into line 37 and is conveyed by jacket 36, line 38, jacket 35 and lines 39 and 22 into tank 21, where it heats and maintains the phosphorus in the molten condition and then is discharged from the system by line 40.

The reactor 13 is equipped with a jacket 41 carrying a heat exchanging medium which absorbs and controls the heat of the phosphorus-sulfur reaction. This medium is supplied to jacket 41 by line 42 and discharged therefrom by line 43.

The reactor 13 is also provided with a motor 44, a motor support 44S and an agitator 46 for intimately mixing the reactants, which is operatively connected to the motor by shaft 45. In addition, inlet and outlet lines 47 and 48, are provided for respectively introducing and discharging an inert gas from the reactor while it is being charged with phosphorus sulfides and/or during the phosphorus-sulfur reaction.

The product of the reaction is discharged from reactor 13 via line 49 into line 50 which is surrounded by a heat exchanging jacket 50A for maintaining the product in a readily flowable condition, the heat exchanging fluid for this purpose being introduced into jacket 50A by line 50B and exhausted therefrom by line 50C. The molten material discharged from the reactor is conveyed by line 50 into flaking rolls 51 which are enclosed in an air-tight housing 52.

The flaking rolls are maintained at a temperature below the solidification point of the molten phosphorus sulfide by means of low quality steam or another suitable heat exchanging medium which is introduced into the rolls 51 by line 53 and discharged therefrom by line 54. The molten product upon contact with the rolls congeals in the form of a film which is removed as thin flakes by means of doctor blades 55 and discharged from the housing 52 by way of outlet 56 into the inlet 57 of a hammer mill 58 or another suitable grinding mill. After grinding the flakes to the desired degree, the ground material is conveyed by outlet 59 into suitable containers or storage bins (not shown).

The flaking and grinding operations are preferably executed in the presence of an inert atmosphere and to insure that this condition prevails, carbon dioxide, nitrogen or another suitable inert gas is introduced into mill 58 by line 60 and then conveyed through outlet 57 into housing 52, from which it is vented to the atmosphere via vent line 61. If desired, the grinding mill 58 and housing 52 may have separate inlets and vents for purging each enclosure with an inert gas.

The following is a description of the method of producing phosphorus pentasulfide continuously in accordance with the foregoing embodiment of the invention.

Molten sulfur (140° C.) and phosphorus (60° C.) are continuously introduced into a charge of molten phosphorus pentasulfide maintained at a temperature of about 300° C. in the above reactor. The sulfur and phosphorus are added at rates of 433 and 167 lbs. per hour respectively and during the ensuing reaction, the reactor is purged with carbon dioxide and the charge vigorously agitated. The molten reaction product is continuously discharged from the reactor at a rate adapted to maintain the level of the charge substantially constant, that is, at the rate of about 600 lbs. per hour. The discharged product is conveyed to the flaking rolls where it is continuously flaked in the presence of carbon dioxide and then fed into the hammer mill. The flakes are reduced to a fine powder in the mill while the latter is purged with an anhydrous inert gas and the resulting product is continuously discharged into suitable containers or bins.

The description of the above continuous process has been restricted to phosphorus pentasulfide, but it is to be understood that phosphorus sesqui- and heptasulfides or mixtures of two or more of these may also be produced in a similar manner by initially charging the reactor with the desired product and after melting same, properly proportioning the sulfur and phosphorus feeds.

In the production of phosphorus sulfides in accordance with the present invention, phosphorus and sulfur are reacted together in the presence of molten product and in substantially the proportions required to yield the desired phosphorus sulfide. At atmospheric pressure, the reaction is executed at a temperature varying from the melting point up to a temperature just below the boiling point of the desired product; at sub- or super-atmospheric pressure, the upper limit of the reaction temperature is the point at which substantial decomposition of the product is avoided. Thus, stated in its broadest aspect, the reaction between phosphorus and sulfur is carried out at a temperature corresponding to the melting point up to a temperature at which substantial decomposition of the desired product is avoided.

More specifically, at atmospheric pressure the phosphorus pentasulfide reaction is performed at a temperature substantially in the range of 286° C. to 513° C.; the phosphorus sesquisulfide reaction at about 171° C. to about 408° C.; and the phosphorus heptasulfide reaction at about 305° C. to about 523° C. In practice, each of the foregoing reactions is executed at a temperature of from 295° C. to 330° C. and within this range a temperature of 300° C. to 315° C. is preferred.

The phosphorus-sulfur reactions are carried out in contact with molten product which absorbs the heat of reaction and transfers it to a suitable heat exchanging surface or medium. This makes it possible to readily control the reaction, avoid the development of side reactions and materially increase the quality, uniformity and yield of the desired product.

The foregoing description has been restricted to methods of producing phosphorus sulfides in which the reaction, the flaking and grinding operations are carried out in the presence of a dry inert atmosphere, but is to be clearly understood that while this is a desirable precautionary measure designed to prevent decomposition of the product by air and moisture, it is not essential to satisfactory operation of the process and, therefore, the invention is not limited thereto.

It will be noted from the above description that the present invention provides a process of directly producing phosphorus sulfides in an exceptionally high state of purity and thereby eliminates the necessity of purifying the product by solution and crystallization from various solvents. Thus, the above process avoids the production of crude mixtures of phosphorus sulfides such as are obtained by directly reacting phosphorus with sulfur in the absence of a solvent and at the same time produces the high quality products of the solvent method without resorting to the use of extraneous solvents which are objectionable for the reasons hereinbefore indicated.

The products of the instant invention are eminently suitable for use in organic synthesis and in a number of commercial applications such as the manufacture of extreme pressure lubricants, match compositions and vulcanized rubber.

While I have described several embodiments of my invention, it will be apparent to those skilled in the art that it is not so limited, but that it is susceptible of various changes and modifications without departing from the spirit thereof.

What I claim is:

1. The process of continuously producing a phosphorus sulfide selected from the group consisting of phosphorus pentasulfide, phosphorus heptasulfide and phosphorus sesquisulfide, which comprises continuously introducing phosphorus and sulfur into a molten mass consisting of said phosphorus sulfide and thereby continuously effecting a reaction between said phosphorus and said sulfur, said reactants being introduced continuously into said molten mass in substantially the proportions calculated to yield said phosphorus sulfide and at a rate maintaining said mass in a molten condition but below that temperature at which substantial decomposition of said phosphorus sulfide occurs.

2. The process of continuously producing a phosphorus sulfide selected from the group consisting of phosphorus pentasulfide, phosphorus heptasulfide and phosphorus sesquisulfide, which comprises continuously introducing phosphorus and sulfur into a molten mass consisting of said phosphorus sulfide and thereby continuously effecting a reaction between said phosphorus and said sulfur, said reactants being introduced continuously into said molten mass in substantially the proportions calculated to yield said phosphorus sulfide and at a rate maintaining the reaction temperature in the range of about 295° C. to about 330° C.

3. The process of continuously producing a phosphorus sulfide selected from the group consisting of phosphorus pentasulfide, phosphorus heptasulfide and phosphorus sesquisulfide, which comprises continuously introducing phosphorus and sulfur into a molten mass consisting of said phosphorus sulfide and thereby continuously effecting a reaction between said phosphorus and said sulfur, said reactants being introduced continuously into said molten mass in substantially the proportions calculated to yield said phosphorus sulfide and at a rate maintaining the reaction temperature in the range of about 300° C. to about 315° C.

4. The process of continuously producing phosphorus pentasulfide, which comprises continuously introducing phosphorus and sulfur into a molten mass consisting of phosphorus pentasulfide in the proportions of about 4 gram atoms of phosphorus to about 10 gram atoms of sulfur and thereby continuously forming phosphorus pentasulfide, said reactants being introduced continuously into said molten mass at a rate maintaining said mass in a molten condition but below that temperature at which substantial decomposition of said phosphorus pentasulfide occurs.

5. The process of continuously producing phosphorus pentasulfide, which comprises continuously introducing phosphorus and sulfur into a molten mass consisting of phosphorus pentasulfide in the proportions of about 4 gram atoms of phosphorus to about 10 gram atoms of sulfur and thereby continuously forming phosphorus pentasulfide, said reactants being introduced continuously into said molten mass at a rate maintaining the reaction temperature within the range of about 286° C. to about 513° C.

6. The process of continuously producing phosphorus heptasulfide, which comprises continuously introducing phosphorus and sulfur into a molten mass consisting of phosphorus heptasulfide in the proportions of about 4 gram atoms of phosphorus to about 7 gram atoms of sulfur and thereby continuously forming phosphorus heptasulfide, said reactants being introduced continuously into said molten mass at a rate maintaining said mass in a molten condition but below that temperature at which substantial decomposition of said phosphorus heptasulfide occurs.

7. The process of continuously producing phosphorus heptasulfide, which comprises continuously introducing phosphorus and sulfur into a molten mass consisting of phosphorus heptasulfide in the proportions of about 4 gram atoms of phosphorus to about 7 gram atoms of sulfur and thereby continuously forming phosphorus heptasulfide, said reactants being introduced continuously into said molten mass at a rate maintaining the reaction temperature within the range of about 305° C. to about 523° C.

8. The process of continuously producing phosphorus sesquisulfide, which comprises continuously introducing phosphorus and sulfur into a molten mass consisting of phosphorus sesquisulfide in the proportions of about 4 gram atoms of phosphorus to about 3 gram atoms of sulfur and thereby continuously forming phosphorus sesquisulfide, said reactants being introduced continuously at a rate maintaining said mass in a molten condition but below that temperature at which substantial decomposition of said phosphorus sesquisulfide occurs.

9. The process of continuously producing phosphorus sesquisulfide, which comprises continuously introducing phosphorus and sulfur into a molten mass consisting of phosphorus sesquisulfide in the proportions of about 4 gram atoms of phosphorus to about 3 gram atoms of sulfur and thereby continuously forming phosphorus sesquisulfide, said reactants being introduced continuously into said molten mass at a rate maintaining the reaction temperature within the range of about 171° C. to about 408° C.

10. The process of continuously producing a phosphorus sulfide selected from the group consisting of phosphorus pentasulfide, heptasulfide and phosphorus sesquisulfide, which comprises introducing phosphorus and sulfur into a molten mass consisting of said phosphorus sulfide and thereby continuously effecting a reaction between said phosphorus and said sulfur, continuously flaking the resulting reaction product as it is formed and continuously grinding the flakes to a finely divided state, said reactants being introduced continuously into said molten mass in substantially the proportions calculated to yield said phosphorus sulfide and at a rate maintaining said mass in a molten condition but below that temperature at which substantial decomposition of said phosphorus sulfide occurs.

OTHA C. JONES.

REFERENCES CITED

The following references are of record in the file of this patent:

UNITED STATES PATENTS

| Number | Name | Date |
|---|---|---|
| 745,546 | Wheelwright | Dec. 1, 1903 |
| 1,153,054 | Frary | Sept. 7, 1915 |

OTHER REFERENCES

Mellor: "Treatise on Inorganic and Theoretical Chemistry" (1928) vol. VIII, pages 1047, 1048 and 1049.